United States Patent [19]

Osmera et al.

[11] 4,394,092

[45] Jul. 19, 1983

[54] METHOD AND APPARATUS FOR HIGH SPEED THERMAL PRINTING

[75] Inventors: Miroslav S. Osmera; Ralf M. Brooks, both of Waterloo, Canada

[73] Assignee: NCR Canada Ltd. - NCR Canada Ltee, Mississauga, Canada

[21] Appl. No.: 333,148

[22] Filed: Dec. 21, 1981

[51] Int. Cl.³ ........................ B41J 31/02; G01D 15/10

[52] U.S. Cl. ................................ 400/120; 346/76 PH; 219/216

[58] Field of Search ........................ 400/105, 120, 124; 346/76 PH; 219/216; 101/93.01, 93.04

[56] References Cited

U.S. PATENT DOCUMENTS

| | | | |
|---|---|---|---|
| 3,354,817 | 11/1967 | Sakurai et al. | 101/93 |
| 3,409,902 | 11/1968 | Merryman | 346/76 |
| 3,567,904 | 3/1971 | Carlsen | 219/216 |
| 3,633,720 | 1/1972 | Tyler | 400/105 |
| 3,984,844 | 10/1976 | Tanno et al. | 346/76 R |
| 3,988,569 | 10/1976 | Henrion | 219/216 |
| 3,989,131 | 11/1976 | Knirsch et al. | 197/1 R |
| 4,088,868 | 5/1978 | Zeuthen | 219/216 |
| 4,136,274 | 1/1979 | Shibata et al. | 219/216 |
| 4,141,017 | 2/1979 | Henrion | 346/76 R |
| 4,195,937 | 4/1980 | Baran | 400/120 |
| 4,355,319 | 10/1982 | Takeuchi et al. | 346/76 PH |

FOREIGN PATENT DOCUMENTS

| | | | |
|---|---|---|---|
| 53-141640 | 12/1978 | Japan | 400/120 |
| 54-116249 | 9/1979 | Japan | 400/120 |
| 55-95583 | 7/1980 | Japan | 400/120 |
| 56-49289 | 5/1981 | Japan | 400/120 |
| 56-55272 | 5/1981 | Japan | 400/120 |
| 2054470 | 2/1981 | United Kingdom | 400/120 |

OTHER PUBLICATIONS

"EKG Recorder & Printer", Karsch, IBM Tech. Discl. Bulletin, vol. 21, No. 10, Mar. 1979, pp. 4271–4272.

"On Board Logic for Multi-Dot Thermal Printhead", IBM Tech. Discl. Bulletin, vol. 24, No. 1A, Jun. 1981, pp. 284–288.

Kitamura, K., "Thermal Display Printer", IBM Tech. Discl. Bull., Dec. 1973, vol. 16, No. 7, p. 2189.

Applegate, S. L. et al., "Electrothermal Ribbon Path", IBM Tech. Discl. Bull., Oct. 1980, vol. 23, No. 5, p. 2012.

*Primary Examiner*—E. H. Eickholt

*Attorney, Agent, or Firm*—J. T. Cavender; Albert L. Sessler, Jr.; Elmer Wargo

[57] ABSTRACT

A method and apparatus for thermally printing on plain paper high resolution fonts such as the ABA's E13B font. In one embodiment, the thermal print head is held stationary while the record medium (like a bank check) and ribbon (containing heat-transferrable ink) are moved, and in a second embodiment, the record medium and the ribbon are held stationary while the printing head is moved. The print head is comprised of printing units with each printing unit having a printing face having resistive heating elements therein. The heating elements are arranged in rows and columns in the associated face to produce a printed dot density of 6.05 N dots per millimeter, wherein N is equal to 1, 2, or 3. Loading of the next pattern of data to be printed is effected while the prior pattern is being "burned" or printed. An R-C circuit is included in the energizing circuit to minimize overheating of the heating elements during repeated energization thereof. Characters or bar codes may be printed by the apparatus.

22 Claims, 9 Drawing Figures

METHOD AND APPARATUS FOR HIGH SPEED THERMAL PRINTING

BACKGROUND OF THE INVENTION

This invention relates to a method and apparatus for high-speed, non-impact, thermal printing which provides sufficient resolution to produce specific styles of fonts such as E13B, CMC-7, OCR-A, OCR-B, Farrington 7B and 12F, and 1403 and 1428 numeric, for example, and which provides also for printing on plain paper.

There appear to be three general print head configurations used in known thermal printers, and they shall be referred to herein as Types 1, 2, and 3 for ease of illustration.

Type 1 configurations have heating elements arranged in a horizontal line extending over the entire page width, allowing the printing of portions of multiple characters to occur simultaneously, with one dot line across the page being printed, line after line, from the top of the page to the bottom. This configuration is also referred to as a line printer.

Type 2 configurations have the heating elements arranged in a vertical line whose length generally does not exceed the height of a single character. Successive indexes in a horizontal direction are necessary to complete the characters. In other words, the print head is advanced horizontally to print one column of a character at a time.

Type 3 configurations have the heating elements arranged in a matrix (like a 5×7 matrix) to fill the entire matrix field. All the heating elements to be energized for a particular character are energized simultaneously. The matrix is then moved to the next character location to complete the printing of that entire character.

A limit on printing speeds with thermal printers is determined by the thermal response of the associated print head and the specific thermal paper used. Stated another way, the printing time is determined by the sum of the heating and cooling of the associated resistive or heating elements and the time required to move the associated print head or record medium to the next printing position. Generally, some smearing of the printing results when a heated print head is moved prior to being sufficiently cooled. A typical present-day printing time would require about 2 milliseconds for energizing the heating elements for the "burn" or heating, about 3 milliseconds for cooling the heating elements, and about 4 milliseconds for stepping the print head to the next printing location. Note that the cooling and stepping of the print head represent a serial operation. This serial operation limits the speed capabilities of the present-day, print heads, generally making them too slow for handling data output in high-speed, computer applications or systems, or other applications where high-speed printing is required.

Another problem is that many of the prior art thermal printers do not provide sufficient definition or resolution of the character printed when compared to laser-xerographic or ink-jet technologies.

Another problem with prior art thermal printers is that they generally employ specialized thermal paper which has a limited shelf life and is not the record medium of choice for a large number of applications.

Another problem is that certain printing styles or fonts using particular inks could be printed by only one or a few printing technologies. For example, the American Bankers Association utilizes a specific standard or font for printing account numbers, amounts, and the like on financial documents, like checks for example; the standard is referred to as the E13B font, and it is printed in magnetic ink of a certain type for use in character-recognition equipment. The prior art method of printing the E13B font generally is limited to using a formed character or type face and a magnetic-ink, impact ribbon to transfer the inked physical impression thereof to the record medium. Noise emission from these prior art impact printers is typically about 80 db A.

SUMMARY OF THE INVENTION

In one embodiment of the invention, the apparatus comprises a printing station; at least one printing unit at said printing station, with each said printing unit having a face, and with each said face being comprised of a matrix of resistive heating elements arranged in rows and columns therein so as to produce a printed dot density of a predetermined number of dots per millimeter; means for positioning a record medium at said printing station; means for providing a ribbon containing heat-transferrable ink at said printing station; means for moving relatively said face of said printing unit, said ribbon, and said record medium into and out of printing relationship at said printing station; and means for energizing momentarily selected ones of said heating elements in said rows when said ribbon, said record medium and said face are in said printing relationship for transferring said ink to said record medium in accordance with a pattern of data to be printed so as to partially complete the printing of said pattern. The moving means include indexing means for providing relative movement (along a line which is perpendicular to said rows) among said face, said ribbon, and said record medium when they are in said printing relationship so as to present said rows of heating elements to an unprinted portion of said record medium to enable progressively, the completing of said pattern of data, whereby upon predetermined numbers of energizations of said heating elements and subsequent indexings by said indexing means, said pattern of data is completed.

One embodiment of the apparatus of this invention utilizes a stationary printing unit and moves the record medium for the relative movement therebetween when they are in the printing relationship mentioned, and a second embodiment of the apparatus utilizes a moveable printing unit and a stationary record member to effect the relative movement therebetween during the printing relationship.

This invention also includes the method of thermally printing data in a high resolution font comprising the steps: (a) providing at least one printing unit at a printing station, with each said printing unit having a two dimensional face, and with each said face being comprised of a matrix of resistive heating elements arranged in rows and columns in each said face to produce a printed dot density of a predetermined number of dots per millimeter; (b) bringing a record medium to be printed upon and a ribbon containing heat-transferrable ink into printing relationship with said face at said printing station; (c) energizing momentarily selected ones of said heating elements in said rows of said face for transferring said ink from said ribbon to said record medium in accordance with a pattern of data to be printed so as to partially complete the printing of said pattern of data; (d) providing relative movement between said record medium and said face (while in said printing relationship) in the direction of said columns at said printing station so as to present said rows of heating elements to an unprinted portion of said record medium to enable the completing of said pattern of data; and (e) repeating steps (c) and (d) predetermined numbers of times so as to complete the printing of said pattern of data.

This invention provides a novel approach to printing E13B font on plain paper by utilizing a non-impact printing technology, namely thermal, along with a uniquely developed one-time, thermal, magnetic-ink, transfer ribbon. Heretofore, all attempts at utilizing nonimpact printing technologies to print in E13B font have failed for a variety of reasons. For example, when magnetic inks are used with an ink jet printer, the iron oxide particles in the ink tend to clog the nozzles of the print head. Electrophotographic printing suffers from unwanted background signals and insufficient character signal intensity.

An object of this invention is to produce a low-cost, low-noise method and apparatus for printing alphanumeric characters in a high resolution font such as the E13B font mentioned, while printing on plain paper.

Another object is to produce an apparatus of the type mentioned in the previous paragraph, which apparatus is also capable of printing bar codes.

An advantage of this invention is that data may be quickly and quietly printed in an E13B font on plain paper such as a check.

Another advantage of this invention is that several fonts may be programmed to be printed on the same line. For example, the recent British I.B.R.O. standard requires that E13B and OCR fonts appear on the same line. Present day encoders are limited to printing in a single font. Another advantage of this invention is that the printing which is effected thereby is of sufficient resolution as to be of "office quality." In a preferred embodiment, a dot density of 6.05 dots per millimeter or a multiple thereof, such as 12.1 dots per millimeter is preferred.

These objects and advantages will be more readily understood in connection with the following description and drawing.

DETAILED DESCRIPTION OF THE INVENTION

Figure 1:
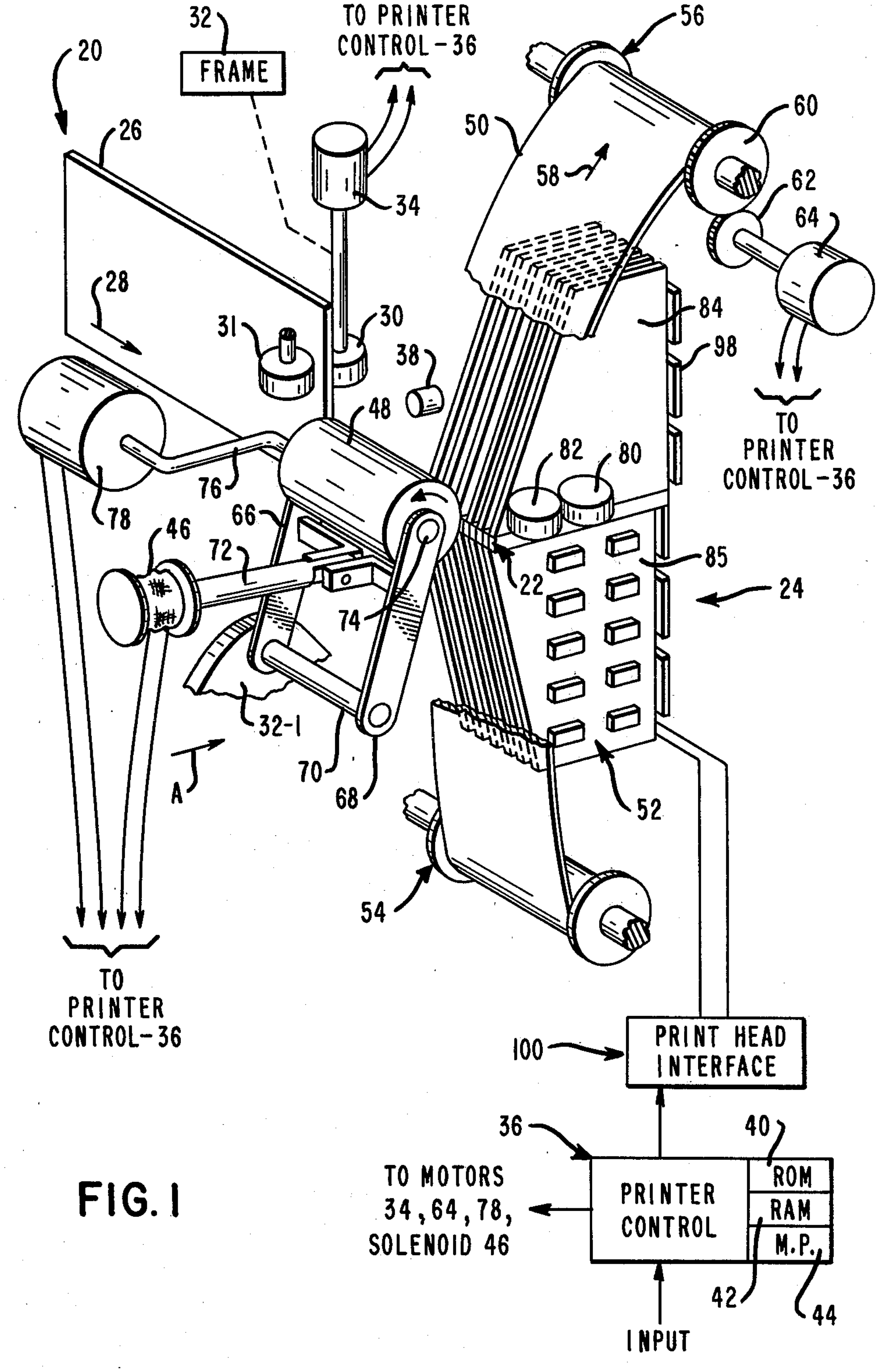
FIG. 1 is a general diagrammatic view, partially in perspective, of a first embodiment of this invention.

FIG. 1 is a general diagrammatic view, partially in perspective, of a first embodiment of the apparatus 20 of this invention.

The apparatus 20 (FIG. 1) includes a printing station 22, and printing means 24 for printing on a record medium 26, which is shown as a bank check, for example, in the embodiment described, using a thermally-sensitive, transfer ribbon 50.

The record medium 26 (FIG. 1) is moved along a first direction shown by arrow 28 by a drive roller 30 and an opposed, cooperating, pinch roller 31 which are suitably mounted in a conventional frame 32 which is shown only diagrammatically in FIG. 1. The drive wheel 30 is driven or rotated by the output shaft of a motor 34 which is controlled by a conventional printer control designated generally as 36. A conventional sensor 38 detects the leading edge of the record medium 26 while it is moving in the direction of arrow 28, and a signal from the sensor 38 is used by the printer control 36 to de-energize the motor 34 so as to position the record medium 26 at the printing station 22. The printer control 36 has the usual ROM 40 for storing software, RAM 42 and microprocessor 44 (MP) for handling the sequencing of operations associated with the apparatus 20.

When the record medium 26 (FIG. 1) is positioned at the printing station 22, the printer control 36 energizes the solenoid 46, thereby moving the driveable platen 48 towards the printing station 22 so as to bring the record medium 26 and the thermally sensitive ribbon 50 into printing relationship with the printing head 52 of the printing means 24. The ribbon 50 is supplied from a supply spool 54 and is fed to the printing station 22 by a take-up spool 56 which moves the ribbon 50 in the direction of arrow 58 in the embodiment described. The take-up spool 56 has a gear 60 on one end thereof, and the gear 60 is in mesh with a driving pinion 62 which is driven by a motor 64 which is under the control of the printer control 36. In the embodiment described, the ribbon 50 is positioned between the printing head 52 and the record medium 26.

The platen 48 (FIG. 1) is supported rotatably in arms 66 and 68, having a rod 70 therebetween, with the rod 70 being supported in a portion 32-1 of the frame 32. The actuator arm 72 of the solenoid 46 is coupled to the arms 66 and 68, and when the solenoid 46 is actuated by the printer control 36, the platen 48 is pivoted about rod 70 in a clockwise direction from the inoperative position shown in FIG. 1 so as to move the platen 48 into printing relationship with the record medium 26 and the ribbon 50 located at the printing station 22. A spring (not shown) may be used to return the platen 48 to the inoperative position when the solenoid 46 is de-energized.

The platen 48 (FIG. 1) is made of a conventional elastomeric material which provides for uniform printing pressure at the printing station 22 and also provides for high friction in order to move the record medium 26 upwardly to effect printing as will be described hereinafter. The platen 48 includes a shaft 74 which is supported rotatably in the arms 66 and 68, and when the shaft 74 is rotated counterclockwise as viewed in FIG. 1, the platen 48 will rotate in the direction of the arrow shown thereon, moving the record medium 26 upwardly as viewed in FIG. 1 to complete the printing, as will be described hereinafter. The shaft 74 is coupled to a flexible driving shaft 76 which is connected to a stepping motor 78 which is under the control of the printer control 36. After the printing is completed, the solenoid 46 is de-energized permitting the platen 48 to move away from the printing station 22, and the motor 34 is energized to drive the record medium 26 in the direction of arrow 28 out of the printing station 22. Thereafter, the leading edge of the record medium 26 is received by the drive roller 80 and associated pinch roller 82 to completely transport the record medium 26 out of the printing means 24. The drive roller 80 is driven in timed relationship with drive roller 30 by a conventional coupling (not shown). During the time that the platen 48 moves the record medium 26 upwardly to effect the printing, the pinch roller 31 may be moved away from the drive roller 30 by conventional means (not shown) to facilitate these movements. As an alternative, the rollers 30 and 31 may be provided with surfaces having less friction than the surface of the platen 48 which permit the record member 26 to be moved upwardly by the platen 48.

Figure 3:
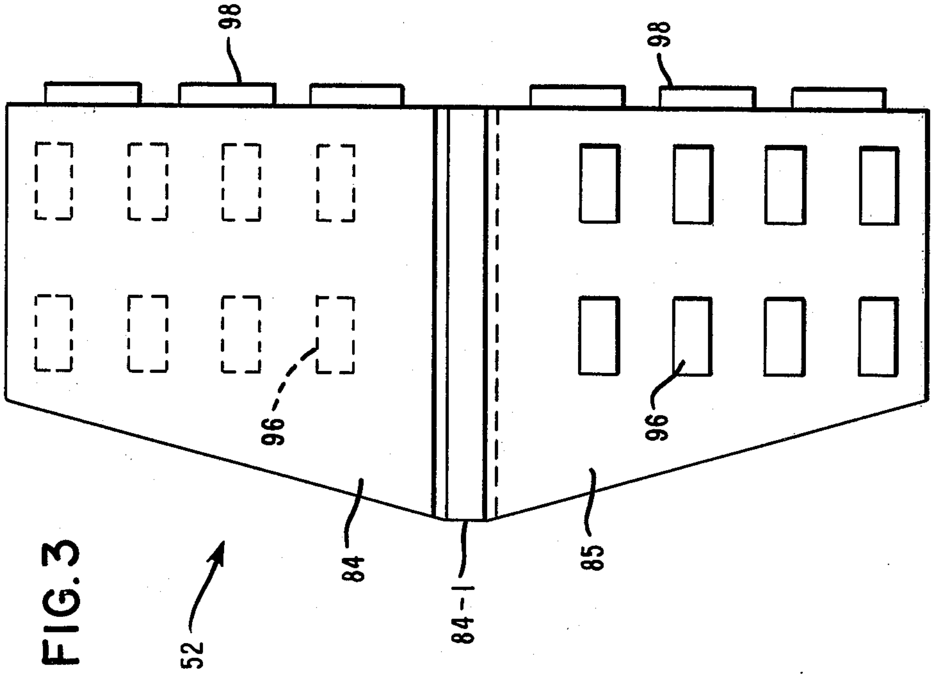
FIG. 3 is the right side view, in elevation of the print head shown in FIG. 1.
Figure 2:
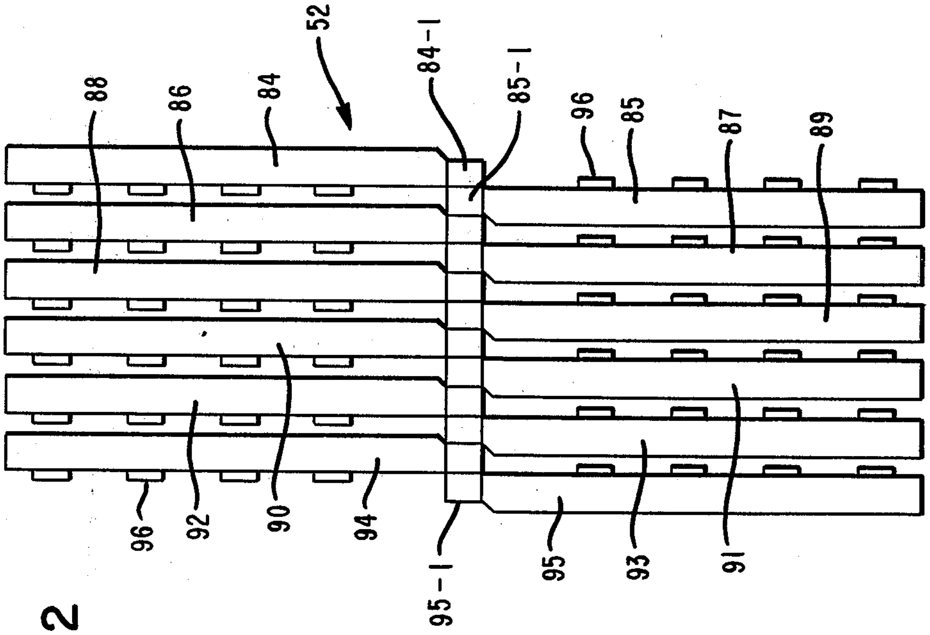
FIG. 2 is a front view in elevation of the printing head shown in FIG. 1 and is taken from the direction of arrow A in FIG. 1.

The printing head 52, shown only generally in FIG. 1, is shown in more detail in FIGS. 2 and 3. The printing head 52 is comprised of a plurality of printing units like 84, and 85 through 95. Each printing unit like 84 and 85 has its own printing face like 84-1 and 85-1, respectively, associated therewith. The printing units 84, 86, 88, 90, 92 and 94 are staggered or offset with printing units 85, 87, 89, 91, 93, and 95 as shown in FIG. 2 to enable the printing faces 84-1, and 85-1 through 95-1 associated with printing units 84-95 to be compactly located along a line of printing or character positions. Each printing face like 95-1 or 84-1 is capable of producing a single character or of producing bar codes as will be described hereinafter. Each printing unit like 84 or 85, for example, has integrated circuit (IC) chips like 96 thereon which are part of the printing means 24 as will be described hereinafter. The IC chips 96 are placed on the same side of the associated printing units 84-95 (which are all identical) so as to effect the offset or staggered relationship shown best in FIG. 2. Conventional connectors 98 are used to connect the printing units 85-95 with one another and with the print head interface 100 shown in FIG. 1.

Figure 4:
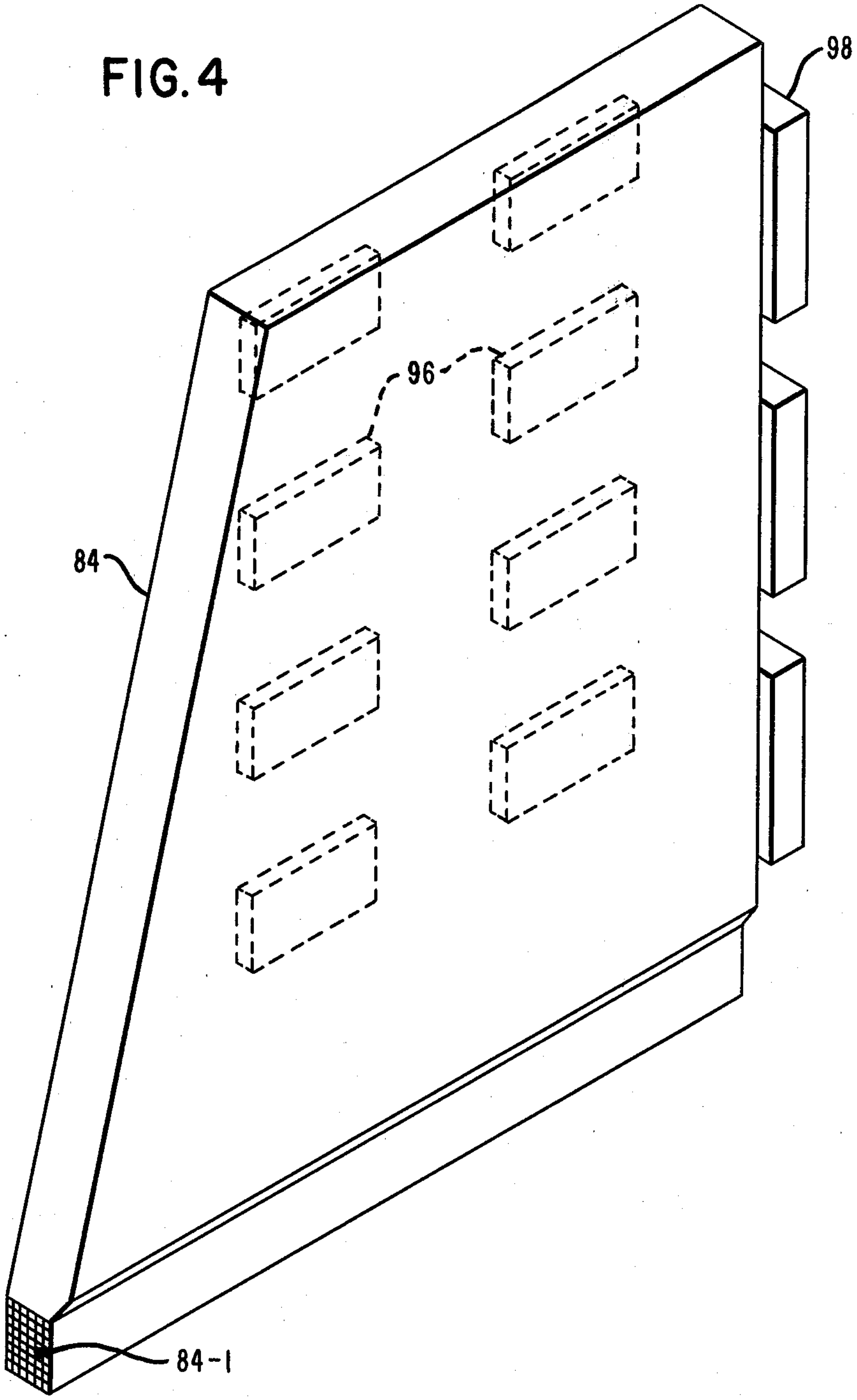
FIG. 4 is a perspective view of one of a plurality of identical printing units which make up the printing head shown in FIGS. 1, 2 and 3.
Figure 5:
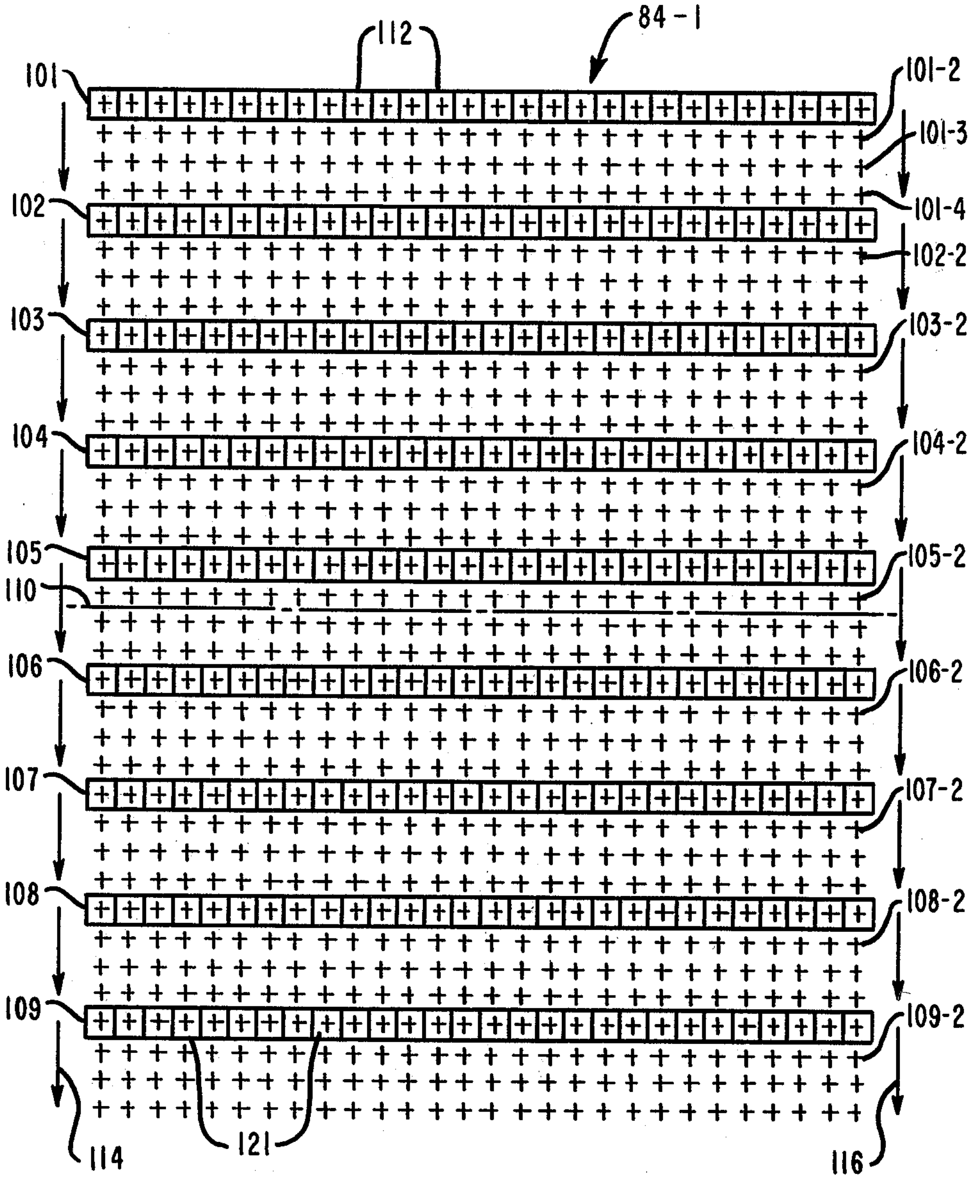
FIG. 5 is an enlarged view of one embodiment of the printing elements located in a printing face of a printing unit.

FIG. 5 is a front view of one printing face such as printing face 84-1 of the printing unit 84 shown in FIG. 4. The printing face 84-1 is a two-dimensional, heating element face which, for example, is used to print one character. The printing face 84-1 is made up of 9 horizontal rows 101–109 as shown in FIG. 5. These rows 101–109 are positioned parallel to a printing line (represented by line 110 in FIG. 5) which is located at the printing station 22 shown in FIG. 1. In the embodiment described, each row like 101, 102, etc., includes 28 individual square heating elements 112, and with 9 rows in the printing face 84-1, there is a total of 252 heating elements 112 in each printing face 84-1.

As stated earlier herein, the printing means 24, in the embodiment described, is designed to print in the E13B font which is utilized by the American Bankers Association. This particular font is well-known and is used for printing account numbers and monetary amounts on checks, for example, in a magnetic ink which facilitates machine reading of these numbers and amounts.

To ensure repeatable, reliable, machine recognition of the E13B font, the character set has been stylized such that when a document containing E-13B print is passed by a magnetic reader, unique magnetic signatures or waveforms are generated by each of the characters in the font. The E13B font character specifications such as character segment "bar" widths and character segment "bar to bar" interspacing have to be precisely maintained in order to preserve the unique magnetic waveform associated with each character.

According to ABA specifications, all E13B characters have horizontal and vertical segments whose edges start and stop on an "14 element horizontal by 18 element vertical" grid where each element in the grid is 0.0065 inches by 0.0065 inches. Therefore, to construct dot-matrix, E13B characters using thermal technology such that the characters produced thereby have appropriate magnetic signatures, requires a thermal element frequency or dot density of $1 \div 0.0065 = 153.8461$ dots/inch or 6.0569 dots/mm. It should be stated that this thermal printhead element frequency has been computed to produce E13B characters whose constituent horizontal and vertical segments adhere strictly to the ABA standard. It has been determined that a tolerance of approximately $\pm 6.35$ dots/inch or $\pm 0.25$ dots/mm about this base element frequency of 153.8461 dots/inch will still produce E13B characters whose signatures lie within the designed tolerance of the magnetic reader recognition algorithm and can therefore be successfully read. Thermal printheads with element frequencies equal to multiples (N) equal to 1, 2, or 3 of this base dot density 153.8461 dots/inch or 6.0569 dots/mm could also be used to produce machine readable E13B font. A preferred embodiment of this invention includes a thermal printhead having an element frequency of $153.8461 \times 2 = 307.6922$ dots/inch or 12.1139 dots/mm, as this dot density produces print which has not only the correct magnetic signature but also produces print which can, upon visual inspection, represent the characters' radii of curvature more exactly.

Figure 6:
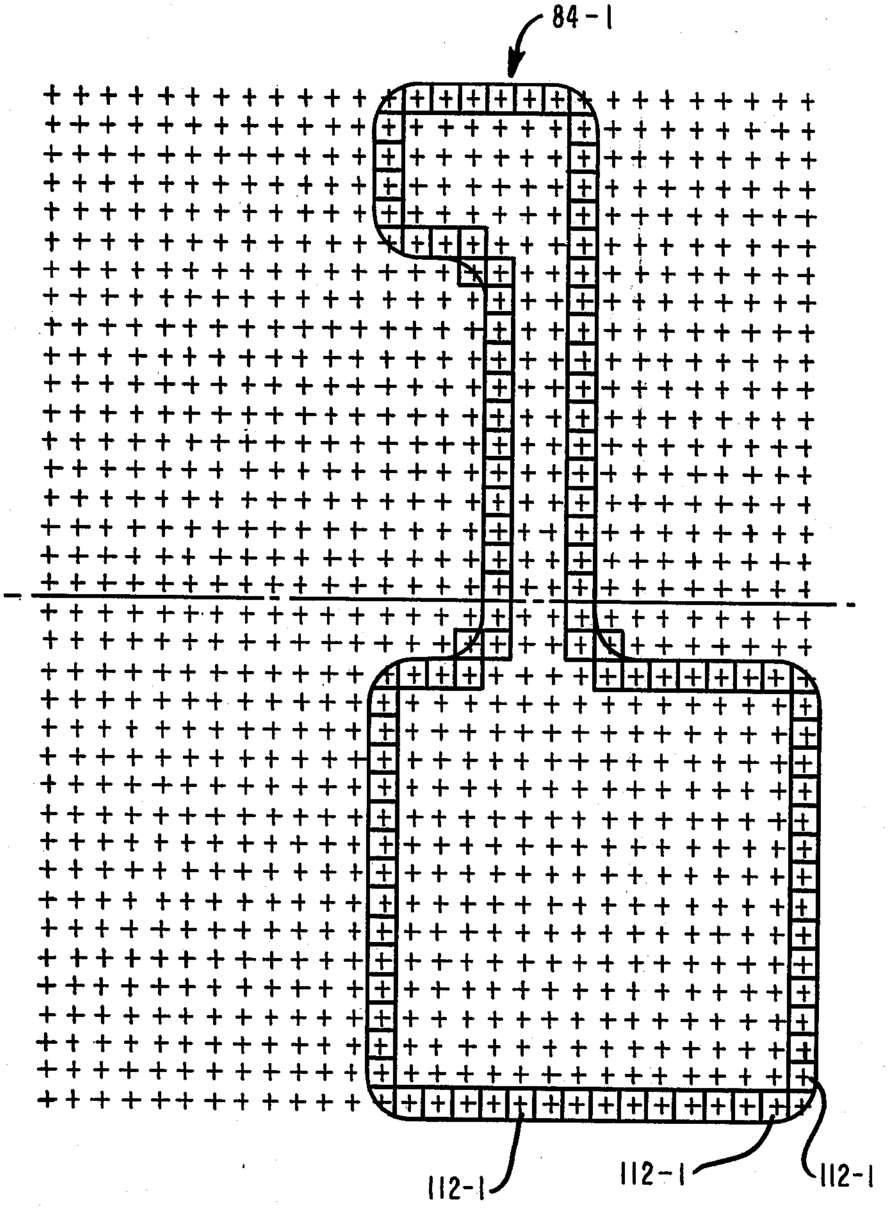
FIG. 6 is an enlarged example showing how selected energization of printing elements in a printing face produce the numeral 1 in a particular printing font.

FIG. 6 provides an enlarged example of the numeral "one" having the particular shape as required by the E13B font. Only the imprints 112-1 from those heating elements like 112 (FIG. 5) which were energized to produce the numeral "one" are shown in FIG. 6 which also shows the relationship of a character to the printing face like 84-1.

In order to produce a character like the one shown in FIG. 6, selected ones of the heating elements 112 (FIG. 5) in each of the rows 101–109 are energized as will be described herein, and thereafter, the record medium like 26 in FIG. 1 is moved upwardly a distance which is equal to a fraction of the distance between adjacent rows like 101 and 102. This relative movement is represented by the arrows like 114 and 116 shown in FIG. 5. After the first energization and indexing as described, the row 101 of heating elements 112 is energized again selectively to print along the line 101-2, and simultaneously and correspondingly, the rows 102 through 109 of heating elements 112 are energized selectively to print along the lines 102-2 through 109-2. The record medium 26 (FIG. 1) then is moved or indexed, similarly, to present the row 101 of printing elements 112 to be energized selectively to print along lines like 101-3 and 101-4. To summarize, there are nine rows of heating elements 112 in a printing face like 84-1 and relative indexing (3 times) between the printing head 52 and the record medium 26 is needed so as to complete the printing of a character after the first lines like 101–109 are completed.

In the embodiment described, the distance between the rows 101 and 102, for example, making up a printing face 84-1 is about 0.0130 inch, and a side of one printing element 112 (which is a square) is 0.0025 inch, with the space between adjacent printing elements 112 as measured along a row, like 101, being 0.00075 inch. The distance between the horizontal rows like 101, 102, etc., was chosen to correspond to a multiple of the spacing between the printing elements 112 as measured along a row like 101. In the example being discussed, the (0.0025+0.00075=0.00325) spacing "times" a multiple (4)=0.0130 inch. At the present time, the spacing between the rows mentioned appears to be the minimum which current technology can provide. The printing density of heating elements 112 along a row like 101 in a printing face like 84-1 is 307.7 "dots" per inch or 12.1 "dots" per mm in the metric system. This density is sufficient to produce satisfactory printing in E13B font. Generally, E13B font printing is effected only by impact printing because the commercially available print heads were not capable of providing the printing dot density required, and the jet spray print heads could not handle the magnetic inks required for the E13B font. A printing face like 84-1, having a printing dot density of 12.1 "dots" per mm may be obtained, for example, from Dynamic Research Corporation of Wilmington, Massachusetts.

In the embodiment described, there are 252 heating elements like 112 in a printing face like 84-1 shown in FIG. 5. In order to produce the high printing speeds obtained by the printing means 24, it is necessary that each printing or heating element 112 have its own electronic driver. This means that each printing face like 84-1 will require 252 connections (for the heating elements) and at least one common power connection.

Figure 7:
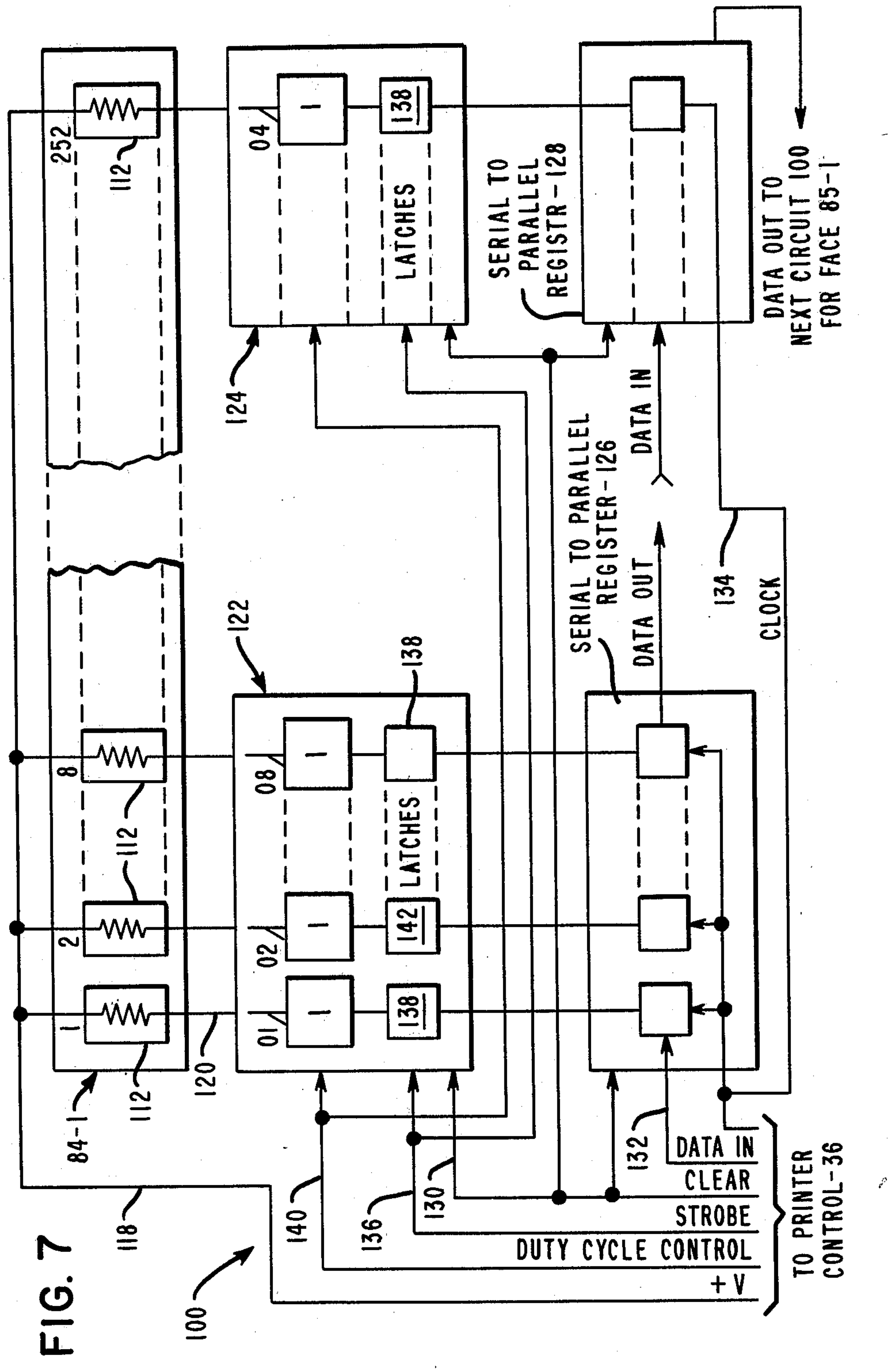
FIG. 7 is a schematic diagram of a print head interface circuit associated with each one of the printing units shown best in FIG. 2.

FIG. 7 is a schematic diagram showing the print head interface circuit 100 shown in FIG. 1. There is one such interface circuit 100 associated with each of the print units 84–95 best shown in FIG. 2, although only one is shown in FIG. 1. For example, the interface circuit 100 is connected to the heating elements 112 in the printing unit 84 as follows.

The printing elements 112 are shown in a straight line in FIG. 7 to facilitate an explanation of the interface circuit 100; however, the heating elements 112 are arranged as shown in FIG. 5. The numbers such as 1, 2, 8, and 252 represent addresses or identification numbers for the 252 heating elements 112 in each printing face like 84-1. Conductor 118 is a common conductor connecting one end of each one of the heating elements 112 to a source of positive potential V+, and the remaining ends like 120 are grounded through circuitry to be described when the particular heating elements 112 are to be energized.

In the embodiment described, each interface circuit 100 (FIG. 7) includes 32 latch/drivers such as latch/-drivers 122 and 124 which are conventional BIMOS latch/driver circuits which feature an open collector output, and which have output transistors capable of sinking up to 500 milliamps of current. The latch/driver circuits such as 122 and 124 may be UCN-4801A Latch/Drivers, for example, which are manufactured by Sprague Corporation, for example. Because only 252 heating elements 112 are required, only four of the latch/drivers in latch/driver 124 (the last one) out of the eight available therein are used.

The interface circuit 100, shown in FIG. 7, also includes a plurality of identical serial-to-parallel 8 bit converters or shift registers such as 126 and 128, with one such register being provided for each of the 8 bit latch/drivers like 122 and 124. Actually, there are 32 registers such as 126 and 128 in the embodiment described. The data out from register 126 is fed into the next register (not shown) in series therewith until the final register 128 is reached. Only four cells are used in the last register 128 as there are only 252 heating elements 112 in an associated printing face like 84-1.

The operation of the interface circuit 100 (FIG. 7) is as follows. A clear pulse from the printer control 36 is fed into the circuit 100 via line 130 to clear all the registers like 126, and the latch/drivers like 122. Next, the printing data is fed from the printer control 36 over the line 132 into the register 126 where it is clocked therein by a clock on line 134. With each clock pulse, data is entered into the register 126 and is shifted down in the registers until all 32 registers including the last one 128 for a character face like 84-1 have been loaded. In the example being discussed, the data in on line 132 is formatted conventionally by the printer control 36, and in this instance, the data consists of a series of binary "ones" and "zeros" which represent, "energize" or "burn" signals for the binary ones and correspondingly, no energization of the associated heating elements 112 for binary zeros. In other words, 252 clock pulses on line 134 are necessary to clock in 252 bits of data for filling the cells of the registers like 126 and 128. At this point, it should be mentioned that the data which is located in the registers like 126 and 128 of circuit 100 (associated with printing face 84-1) actually is the data which is to be downshifted, eventually, to those registers in a similar circuit 100 associated with the printing face 95-1 shown in FIG. 2. To accomplish this end, the data out from register 128 of circuit 100 is fed into the first register like 126 of another circuit 100 which is not shown but is associated with printing face 85-1. In other words the interface circuits 100, associated with printing faces 84-1 through 95-1 shown in FIG. 2, are connected in loop fashion so that the output from the last register like 128 of an interface circuit 100 is fed into the first register like 126 of an interface circuit like 100 associated with the next printing face like faces 85-1 through 95-1.

In the embodiment described, there are twelve character positions or printing faces 84-1 through 95-1 (FIG. 2) in the printing means 24, so that the last 252 bits of data (252 bits of data for each of the 12 character positions) which are fed into the interface circuit 100 associated with the printing face 84-1 in FIG. 7 actually are the bits of data for the printing face 84-1. The connections for the "data out" from the last register like 128 of one interface circuit 100 associated with a printing unit like 84 to the first register like 126 of the interface circuit 100 associated with the next printing unit like 85 may be effected by the connector 98 shown, for example, in FIGS. 1 and 3. This technique just described minimizes the number of connectors which must be provided from the printer control 36 to the interface circuits 100 mentioned.

After all the bits of data for the twelve printing faces 84-1 through 95-1 (FIG. 2) are serially loaded into the serial to parallel registers like 126 and 128 in each of the associated interface circuits 100 as described in the previous paragraph, a strobe pulse, from the printer control 36 is routed over conductor or line 136 (FIG. 7) in parallel to each of the driver/latches like 122 and 124 of the individual interface circuits 100 associated with the printing faces 84-1 through 95-1. The strobe pulse on line 136 latches the data which is in the registers like 126 and 128 (transferred in parallel) into the latches 138 of the associated driver/latches 122 and 124, respectively. The next pulse which is generated by the printer control 36 is the duty cycle control pulse which is fed over line 140 in parallel to each of the driver/latches like 122 and 124 for all the interface circuits 100 described. Basically, the duty cycle control pulse controls the "burn time" or time period during which the heating elements 112 selected to be energized remain energized. The driver/-latch circuits like 122 and 124 have transistors 123 (shown in FIG. 8) in their output stages which are gated on by the duty cycle control pulse on line 140; conventional circuits such as integrated circuit chips #UCN48-01A may be used for these circuits 122 and 124, for example. The data which is stored in the latches 138 is gated with the duty cycle control pulse to select which of the heating elements 112 is to be energized. For example, a binary one stored in latch 138 for position 1 in driver/latch 122 in FIG. 7 means that heating element 112, also marked #1 in printing face 84-1, will be energized as long as the duty cycle control pulse on line 140 is on. Contrastingly, if the latch marked 142 in latch/-driver 122 has a binary zero therein, then the heating element 112, also marked #2 in printing face 84-1, will not be energized when the duty cycle control pulse is on.

An important feature of this invention is that while the duty cycle control pulse on line 140 (FIG. 7) is on, and the heating elements 112 are co-acting with the ribbon 50 (FIG. 1) to transfer the ink to the record member 26, the next group of data to be printed may be loaded into the registers like 126 and 128 of the interface circuits 100 as previously described. In other words, while the data for rows 101, 102, 103, etc. in the printing face 84-1 in FIG. 5 is being printed, the data for rows 101-2, 102-2, 103-2 etc. is loaded into the registers 126 and 128 of the associated interface circuits 100. In other words, the duration of the "burn" time of the heating elements 112 is independent of the time for loading the registers like 126 and 128.

Figure 8:
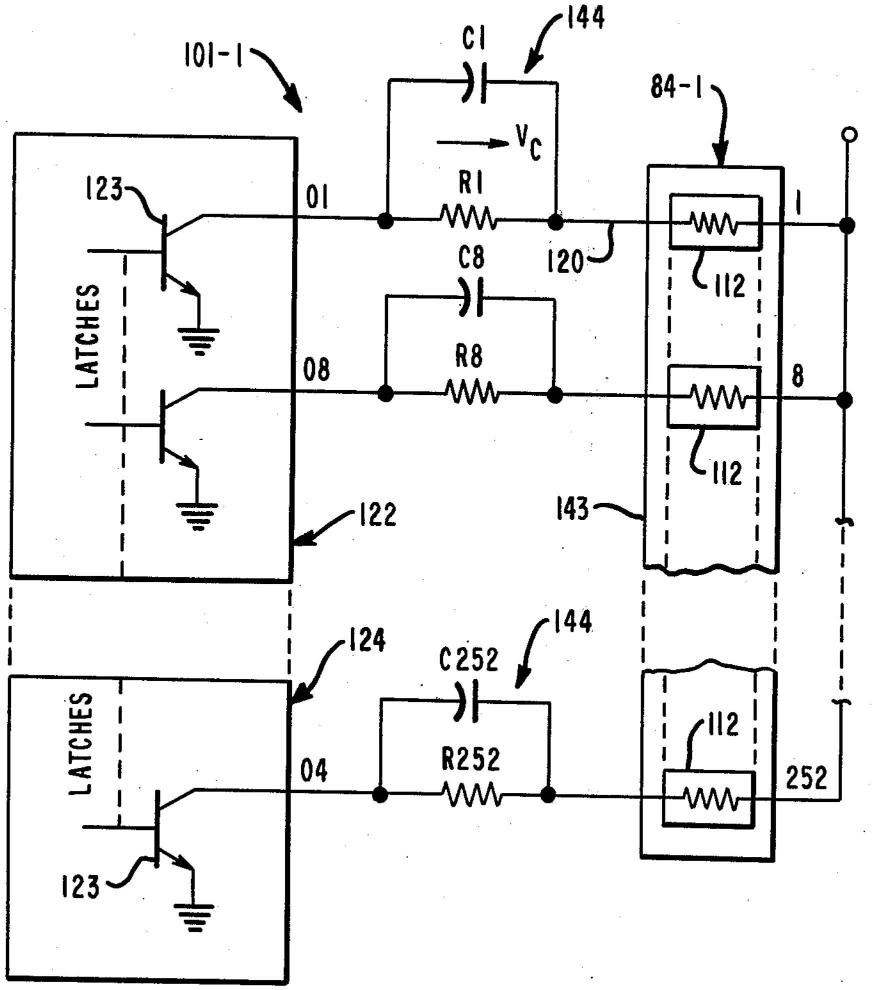
FIG. 8 is a schematic diagram showing a modified portion of the circuit shown in FIG. 7.

Another embodiment of this invention relates to a portion of circuit 100 (FIG. 7) which is modified and shown as interface circuit 100-1 in FIG. 8. The interface circuit 100-1 is identical to interface circuit 100 shown in FIG. 7 except for the differences to be discussed; accordingly, identical reference numbers will be used in FIGS. 7 and 8 to identify identical parts.

The important feature of circuit 100-1 (FIG. 8) relates to its ability to prevent a printing face like 84-1 from overheating when repeated energizations of a particular printing element or elements 112 occur. The printing elements 112 are thin film resistors which are deposited upon a substrate 143 which is shown diagrammatically in FIG. 8. Generally, the time period for heating a printing element like 112 is shorter than the time period for cooling, and the type of material selected for the substrate 143 affects the rate at which cooling occurs. In the present embodiment, the substrate 143 is made of glass although other materials such as ceramics may be used. When the ribbon 50 (FIG. 1) is in printing relationship with the record medium 26 and the heating elements 112 are energized, the following events occur. The heating elements 112 produce heat which melts the ink which is coated on the ribbon 50, and because the coating of ink is in direct contact with the plain paper of the record medium 26, it is transferred thereto. The ink is permanently fused to the record medium 26 as soon as the temperature of the heated record medium 26 falls below the melting point of the ink. For repeated energization of the same heating elements 112, the interface circuit 101-1 shown in FIG. 7 decreases the electrical energy supplied thereto so that the temperature of the heating elements 112 does not go up, markedly, above that required to melt the ink on the ribbon 50.

The interface circuit 100-1 (FIG. 8) includes a resistor like R1 and a capacitor like C1 in an R-C combination located between the associated output like 01 from the latch/driver 122 and the associated heating element 112, also marked 1. There is one such R-C combination designated as 144 for each heating element 112 in each printing face like 84-1. Initially, the voltage across the capacitor C1 is zero; therefore, the first energizing pulse is passed in total therethrough to the associated heating element 112. The time constant of the R-C combination 144 is long enough so that there is some residual voltage (VCR) left on the capacitor prior to the arrival of the next usual energizing pulse. Thus, the voltage delivered to the heating element 112 will not be the total +V, but it will be (V-VCR). Should a string of successive energizing pulses be sent to the same printing element 112, the voltage across the associated capacitor like C1 will increase, thereby decreasing the power supplied to the heating element 112 and stabilizing the temperature of the printing face like 84-1. With this technique, repeated energizations or "burns" of the heating elements 112 will not raise the temperature of the ink on the ribbon 50 much in excess of its melting temperature, thereby enabling a faster print rate. The values of the resistors like R1 and R252 and the capacitors like C1 and C252 are dependent upon the particular parameters (chosen for the printing means 24) such as the substrate 143, heating elements 112 and energizing current. In addition to the physical dimensions of the printing means 24 already given, the density of heating elements 112 along a row like 101 in a printing face like 84-1 (FIG. 5) in the embodiment described is 12.1 squares or dots per millimeter. In this embodiment, the value of resistor R1, for example, is 200 ohms, and the value of capacitor C1, for example is 100 $\mu$F, and the energizing current is about 100 milliamps. Successive energizing pulses to the heating elements 112 occur at intervals of about 10 milliseconds. Four indexes are required to complete a printing over the entire face 84-1 which in the embodiment described, takes about 40 milliseconds.

When the printing head 52 (FIG. 1) is to be used for printing bar coes, the selected heating elements 112 are energized and left on while the record medium like 26 is moved upwardly for the height of the tallest bar or for the entire 0.0132 inch (in the example being described) which represents the distance between adjacent rows like rows 101 and 102 in FIG. 5. No cooling time or very little cooling time is required when printing bar codes because the objective is to "brush" the bar codes on the record medium. The "brushing" technique which eliminates the cooling periods brings about a 15% increase in printing speed over that employed herein to print characters. When printing characters, some cooling time between successive energizations of the heating elements 112 is necessary to allow the ink which is transferred from the ribbon 50 to the record medium 26 to cool before moving the record medium 26, to avoid causing the still-heated ink to smear. Each of the printing units like 85 may be provided with cooling channels which are connected to a fluid medium like air to provide some overall cooling of the printing head 52 if found necessary or desireable.

While the ribbon 50 is shown being transported in a vertical direction in FIG. 1, it could also be transported, for example, in the direction of arrow 28 if found necessary or desirable.

Figure 9:
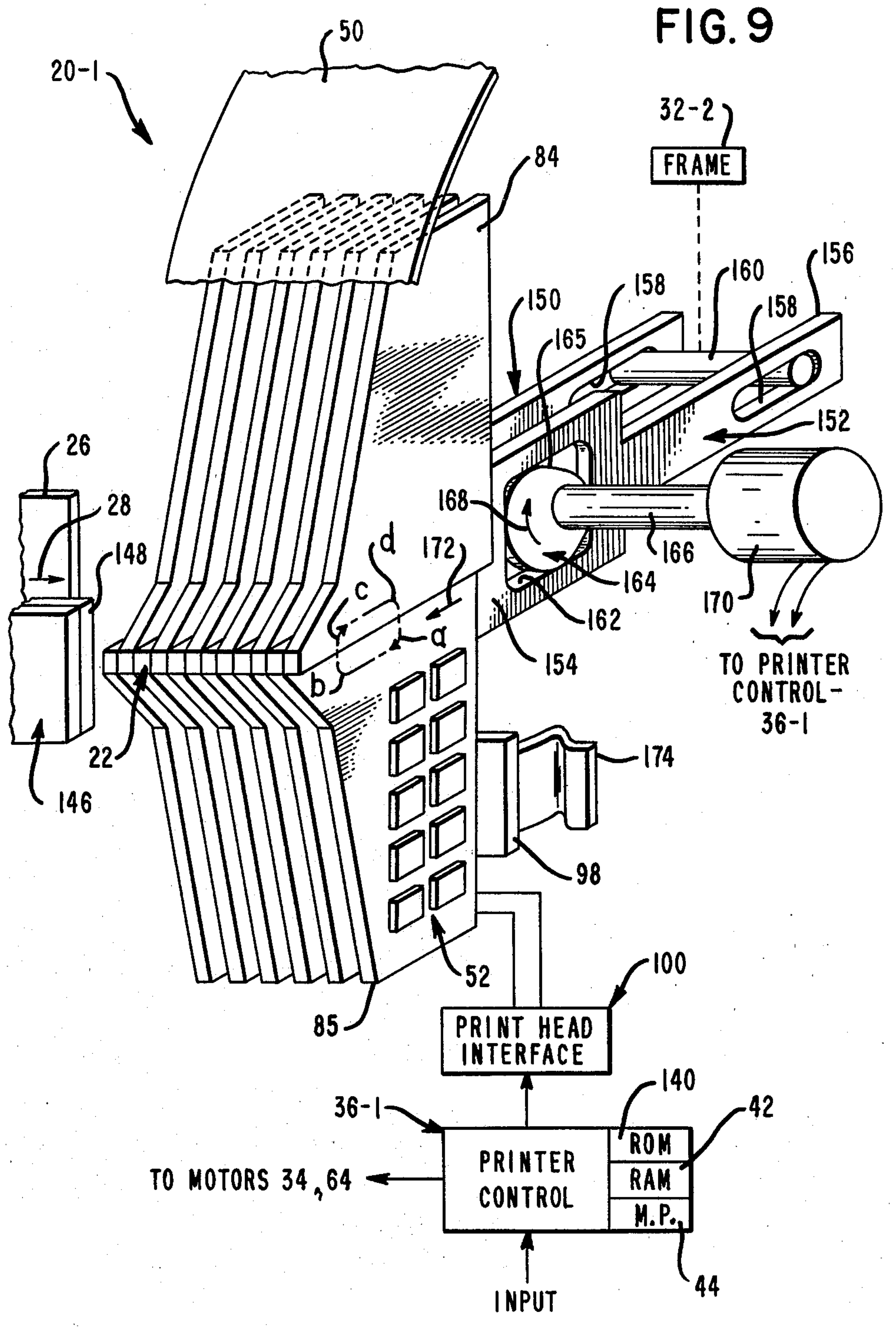
FIG. 9 is a general diagrammatic view, partially in perspective, of a second embodiment of this invention.

FIG. 9 is a general diagrammatic view, partially in perspective, showing a second embodiment of this invention which is designated generally as apparatus 20-1. The apparatus 20-1 is identical to apparatus 20 (FIG. 1) except where indicated herein. Accordingly, like elements in FIGS. 1 and 9 are assigned the same reference numerals.

The apparatus 20-1 (FIG. 9) has a printing head 52, as previously described, and the printing station 22. The record medium 26 is transported to and positioned at the printing station 22 as previously described. The apparatus 20-1 is provided with a stationary platen 146 having an elastomeric layer 148 on the side facing the printing head 52.

In the apparatus 20-1 (FIG. 9), the platen 146 is stationary and the printing head 52 is moved to obtain the relative motion between the record medium 26 and the printing head to effect the printing. The means for moving the printing head 52 includes a pair of identical support arms 150 and 152 having first ends like 154 which are secured rigidly to the printing head 52. The opposite ends 156 have elongated slots 158 therein to slidably receive a pin 160 which is fixed to the frame 32-2 (shown only diagrammatically in FIG. 9). Each of the first ends 154 of the arms 150 and 152 has control surfaces forming a rectangular slot like 162 therein to receive an associated cam member like 164. The cam members 164 are fixed to a shaft 166 to be rotated thereby, and they have cam surfaces like 165 thereon which cooperate with the slot 162 to produce the motion in the printing head 52 shown by path a, b, c, and d, shown in dashed outline in FIG. 9. The shaft 166 is rotated intermittently in the direction of arrow 168 by a stepping motor 170 which is controlled by the printer control 36-1. As the cam member 164 is rotated, the printing faces 84-1 through 95-1 of the printing head 52 follow the path a, b, c, and d with regard to the printing station 22, while the ends 156 of the arms 150 and 152 slide and pivot with regard to pin 160.

The operation of the apparatus 20-1 shown in FIG. 9 is as follows. The record medium 26 is moved to the printing station 22 as previously described. Assume that the printing head 52 is withdrawn from the record medium 26 and is in the position indicated by the letter "a" in its path of travel. When printing is to be effected, the stepping motor 170 rotates the cam member 168 so as to move the printing head 52 in the direction of arrow 172 or along the portion "a" to "b" of the print head path until the printing head 52 is in printing relationship with the ribbon 50, record medium 26, and platen 146. At this point, the stepping motor 170 is momentarily stopped to enable the printing of rows 101 through 109 associated with a printing face like 84-1 shown in FIG. 5 by energizing momentarily the selected heating elements 112 to melt the ink in the ribbon 50 to enable it to be transferred to the record medium 26. Thereafter, the ink cools, and the stepping motor 170 is energized to move incrementally the printing head 52 upwardly along the path from "b" towards "c" to print the second printing which would be analogous to print rows like 101-2, 102-2, etc. as previously described in relation to FIG. 5. However, the printing of a character is "developed" in FIG. 9 "upwardly" as the printing head 52 moves upwardly whereas a character was "developed" downwardly in FIG. 1 as shown by arrow 114 in FIG. 5. The necessary formatting of the characters is effected by the printer control 36-1 (FIG. 9) which is generally similar to printer control 36 shown in FIG. 1. After the fourth energization of the heating elements 112 to complete a character as represented by row 101-4, for example, in FIG. 5, the stepping motor 170 may run in a continuous mode to move the printing head 52 away from the platen 146 as shown by path "c" to "d", and to lower the printing head 52 as shown by path "d" to "a". The printing of the characters at the print faces 84-1 through 95-1 is then completed and the record medium 26 may be moved out of the printing station 22. The print head interface 100 is shown as a separate item in FIG. 9; however, it or portions thereof may be found on the printing units like 84-95. The printing units mentioned, like 85, have connectors 98 and flexible cables like 174 to effect the connections mentioned with regard to the circuit 100 shown in detail in FIG. 7.

We claim:

1. An electroresistive printing apparatus comprising:
a printing station;
at least one printing unit at said printing station, with each said printing unit having a face, and with each said face being comprised of a matrix of resistive heating elements arranged in rows and columns so as to produce a printed dot density of a predetermined number of dots per millimeter;
means for positioning a record medium at said printing station;
means for providing a ribbon containing heat-transferrable ink at said printing station;
means for moving relatively said face of said printing unit, said ribbon, and said record medium into and out of printing relationship at said printing station;
means for energizing momentarily selected ones of said heating elements in said rows when said ribbon, said record medium and said face are in said printing relationship for transferring said ink to said record medium in accordance with a pattern of data to be printed so as to partially complete the printing of said pattern; and
said moving means including indexing means for providing relative movement (along a line which is substantially perpendicular to said rows) among said face, said ribbon, and said record medium when they are in said printing relationship so as to present said rows of heating elements to an unprinted portion of said record medium to enable progressively the completing of said pattern of data, whereby upon predetermined numbers of energizations of said heating elements and subsequent indexings by said indexing means, said pattern of data is completed.

2. The apparatus as claimed in claim 1 in which said heating elements are arranged in rows and columns so as to produce a printed dot density of 6.05 (N) dots per millimeter, wherein N is equal to 1, 2, or 3.

3. The apparatus as claimed in claim 2 in which said printing station includes a plurality of said printing units which are arranged in a line thereat, and in which said N is equal to 2 and in which each said row of heating elements in a said face is comprised of 28 said heating elements.

4. The apparatus as claimed in claim 2 in which said printing station includes a plurality of said printing units which are arranged in a line thereat, and in which said N is equal to 1 and in which each said row of heating elements in a said face is comprised of 14 said heating elements.

5. The apparatus as claimed in claim 2 in which said face is of a size satisfying the requirements of an E13B font, and in which said heating elements have a spacing density (as measured along said rows) corresponding to said printed dot density; and in which said rows have a spacing density (as measured along said columns) which is chosen to correspond to a multiple of the spacing density of said heating elements as measured along said rows; and in which said ink is a magnetic ink, satisfying the requirements of said E13B font.

6. The apparatus as claimed in claim 5 further comprising a plurality of printing units which are identical to said one printing unit and are formed into a printing head; some of the printing units in said printing head being inverted with respect to the remaining said printing units in said printing head so as to provide a nested relationship among said printing units, and to enable said faces of said printing units to be aligned so as to provide a line of printing at said printing station.

7. The apparatus as claimed in claim 5 in which said printing unit is stationary, and in which said moving means comprises:

a cylindrical platen; and second moving means for moving said platen between first and second positions; in which said second position said ribbon and record medium are moved into said printing relationship.

8. The apparatus as claimed in claim 7 in which said indexing means comprises a motor and means for coupling said motor with said platen for incrementally rotating said platen along said line which is perpendicular to said rows.

9. The apparatus as claimed in claim 8 in which said positioning means moves said record medium towards said printing station in a direction which is perpendicular to said columns in said face.

10. The apparatus as claimed in claim 9 in which said energizing means includes a circuit comprising:

means for receiving serial data and storing and converting the serial data into a plurality of parallel outputs corresponding to said pattern of data to be printed; and means for storing said plurality of parallel outputs; said storing means being operatively coupled to said resistive heating elements to enable said parallel outputs to energize said resistive heating elements according to said pattern of data upon the occurrence of an energizing signal;

said receiving means being capable of receiving serial data representing a next said pattern of data to be printed while said heating elements are being energized during the occurrence of said energizing signal.

11. The apparatus as claimed in claim 10 in which said circuit further comprises an R-C network coupled between each said parallel output of said storing means and its associated said resistive heating element so that during repeated energizations of a said resistive heating element, the associated said R-C network will reduce the current passing thereto and thereby minimize the overheating of said last named resistive heating element.

12. The apparatus as claimed in claim 6 in which said moving means comprises:

a stationary platen; and means for mounting said printing head for movement relative to said stationary platen.

13. The apparatus as claimed in claim 6 in which said printing head is moveable, and in which said moving means comprises:

a stationary platen positioned at said printing station;

means for supporting said printing head;

said supporting means having a first control surface thereon;

a cam member;

means for rotating said cam member;

said cam member having a first cam surface which cooperates with said first control surface for moving said printing head from said non-printing position into said printing relationship as said cam member is rotated.

14. The apparatus as claimed in claim 13 in which said indexing means comprises a second cam surface which cooperates with said first control surface to move said printing head along said line which is perpendicular to said rows while said printing head is in said printing relationship.

15. The apparatus as claimed in claim 14 in which said positioning means moves said record medium towards said printing station in a direction which is perpendicular to said columns in said faces.

16. The apparatus as claimed in claim 13 in which said energizing means includes a circuit comprising:

means for receiving serial data and storing and converting the serial data into a plurality of parallel outputs corresponding to said pattern of data to be printed;

means for storing said plurality of parallel outputs; said storing means being operatively coupled to said resistive heating elements to enable said parallel outputs to energize said resistive heating elements according to said pattern of data upon the occurrence of an energizing signal;

said receiving means being capable of receiving serial data representing a next said pattern of data to be printed while said heating elements are being energized during the occurrence of said energizing signal.

17. The apparatus as claimed in claim 16 in which said circuit further comprises an R-C network coupled between each said parallel output of said storing means and its associated said resistive heating element so that during repeated energizations of a said resistive heating element, the associated said R-C network will reduce the current passing thereto and thereby minimize the overheating said last named resistive heating element.

18. A method of thermally printing data in a high resolution font comprising the steps:

(a) providing at least one printing unit at a printing station, with each said printing unit having a two dimensional face, and with each said face being comprised of a matrix of resistive heating elements arranged in rows and columns to produce a printed dot density of a predetermined number of dots per millimeter;

(b) bringing a record medium to be printed upon and a ribbon containing heat-transferrable ink into printing relationship with said face at said printing station;

(c) energizing momentarily selected ones of said heating elements in said rows of said face for transferring said ink from said ribbon to said record medium in accordance with a pattern of data to be printed so as to partially complete the printing of said pattern of data;

(d) providing relative movement between said record medium and said face (while in said printing relationship) in the direction of said columns at said printing station so as to present said rows of heating elements to an unprinted portion of said record medium to enable progressively the completing of said pattern of data; and (e) repeating steps (c) and (d) predetermined numbers of times so as to complete the printing of said pattern of data.

19. The method as claimed in claim 18 in which said step (a) comprises arranging said heating elements in rows and columns in each said face to produce a printed dot density of 6.05 (N) dots per millimeter, wherein N is equal to 1, 2, or 3.

20. The method of printing as claimed in claim 19 in which said step of providing relative movement is effected by moving said record medium and said ribbon in the direction of said columns while holding said face stationary.

21. The method of printing as claimed in claim 20 in which said bringing step is effected by moving said record medium in a direction which is perpendicular to said columns.

22. The method of printing as claimed in claim 21 in which said step of providing relative movement is effected by holding said ribbon and record medium stationary while moving said face in the direction of said columns.

* * * * *